United States Patent [19]

Weaver et al.

[11] Patent Number: 4,898,021
[45] Date of Patent: Feb. 6, 1990

[54] QUANTITATIVE AIR INLEAKAGE DETECTION SYSTEM AND METHOD FOR TURBINE-CONDENSER SYSTEMS

[75] Inventors: Karen L. Weaver; Michael Twerdochlib, both of Oviedo, Fla.

[73] Assignee: Westinghouse Electric Corp., Pittsburgh, Pa.

[21] Appl. No.: 277,827

[22] Filed: Nov. 30, 1988

[51] Int. Cl.$^4$ .............................................. G01M 3/04
[52] U.S. Cl. ...................................... 73/40.7; 165/11.1
[58] Field of Search ............................ 73/40.5 R, 40.7; 165/11.1

[56] References Cited

U.S. PATENT DOCUMENTS

| | | | |
|---|---|---|---|
| 3,087,327 | 4/1963 | Kagi | 73/40.7 |
| 3,186,214 | 6/1965 | Roberts | 73/40.7 |
| 3,522,008 | 7/1980 | Defabaugh et al. | 165/11.1 |
| 4,232,546 | 11/1980 | Dumont | 73/40.7 |
| 4,404,843 | 9/1983 | Johnson et al. | 73/40.7 |
| 4,688,627 | 8/1987 | Jean-Luc et al. | 73/40.7 |
| 4,690,689 | 9/1987 | Malcosky et al. | 73/40.7 |
| 4,776,208 | 10/1988 | Dimeff | 73/40.7 |

OTHER PUBLICATIONS

Fochtman et al.; "Nondistructive Test Cartridge Filter Elements," Proceedings of the Filtration Society, 9–1971.

Primary Examiner—Hezron E. Williams

[57] ABSTRACT

An improved tracer gas leak detection system and method for air inleakage testing of a turbine-condenser system quantified leak testing with two new elements: one, by providing discharge of a fixed, reproducible amount of tracer gas at a possible leak site, which is accomplished by controlling the flow rate, pressure and time interval of the discharge. Secondly, the total amount of tracer gas subsequently detected within the turbine-condenser is determined by integrating the detector response.

1 Claim, 2 Drawing Sheets

4,898,021

QUANTITATIVE AIR INLEAKAGE DETECTION SYSTEM AND METHOD FOR TURBINE-CONDENSER SYSTEMS

BACKGROUND OF THE INVENTION

This invention relates to detecting air inleakage into a steam turbine-condenser system and, more particularly, to a quantitative method for detecting leaks in a steam turbine system using a tracer gas.

The effective monitoring and control of air inleakage into a steam turbine-condenser system is critical to minimizing corrosion of turbine components caused by oxygen and carbon dioxide, and also to reduce vibration of low pressure turbine blading caused by air inleakage. During turbine operation, pressure within portions of the turbine is less than one atmosphere so that air may be drawn into the turbine through leaks at various joints and seals. A known method of air inleakage detection in use at the present time has disadvantages in that it fails to pinpoint the location of leaks or indicate their relative size with any degree of accuracy, because it is not quantitative. As a result, a great many man hours are often required to find leaks in a turbine-condenser system. The procedure now in use involves pulling a vacuum on the system using a condenser air exhaust pump. A calibrated flowmeter is installed at a penetration point in the turbine-condenser system just above the condenser hotwell. This creates a controllable leak which is utilized in setting leak rates. At each leak rate, an approximate amount of tracer gas, determined by a technician counting seconds, is released through a pistol nozzle across the orifice of the flowmeter from a distance of approximately three inches. Several trials are made at preset flow rates, and the average detector response of a tracer gas detector, positioned within the turbine-condenser system, is plotted against the released amounts of tracer gas, estimated semi-quantitatively, as described. During a test of the turbine-condenser system for leaks, tracer gas is released to a possible leak site outside the turbine system in an amount determined by a technician by approximating the time of release. Since the turbine system internal pressure is less than ambient, the gas is drawn into the turbine system through any seal or joint leaks. Because the time of release is not accurately measured, the amount of gas released from one test to another is variable even when the same technician is releasing the tracer gas. Leak rates are then determined from the plotted curve, using the detector responses from the tests of controlled leaks. However, leaks of the same magnitude can result in different detector responses, depending on leak location. For example, tracer gas sprayed at a leak adjacent an expansion joint between the hotwell and the condensate pump must travel through the entire turbine system before it is exhausted and detected and will cause the detector to respond with a broader, lower rise in measured tracer gas than the response generated by the same size leak in the air removal system, which latter leak causes a narrow high peak in detector response. The size and seriousness of the leaks may be substantially the same, but an instantaneous reading of the detector may not so indicate. A leak closer to the detector generally appears much worse than a leak farther away.

Typically, it takes two technicians three to five days to completely leak test a turbine-condenser system. A significant amount of turbine down time can be consumed simply waiting for the tracer gas detector to clear because too much tracer gas may have been released by the technician due to lack of quantitative controls. Moreover, it is often difficult to distinguish between major leaks, the repair of which would significantly reduce total air inleakage, and very minor leaks which could be, at least temporarily, ignored. At times, many hours are spent repairing the smaller leaks without significantly reducing overall leakage because major leaks remain, requiring additional testing and repair time. It is estimated that air inleakage testing could be reduced by one to three days by employing a more quantitative approach for measuring and determining the amount of tracer gas entering a leak site.

SUMMARY OF THE INVENTION

It is an object of this invention to provide a system and method of testing air inleakage in a turbine-condenser system which avoids the disadvantages of the prior art systems and methods set forth above.

The above and other objects and features of the invention are attained in an improved tracer gas leak detection system and method for air inleakage testing of a turbine-condenser system which quantifies the released and detected tracer gas. A fixed amount of tracer gas is released at a possible leak site by controlling flow rate, pressure and time interval of the release, and the total amount of tracer gas subsequently detected to have entered the turbine-condenser is determined by integrating the detector response over time. In a preferred embodiment, the invention is illustrated to include a pressurized source of tracer gas equipped with a pressure regulator and connected by a supply line to a spray nozzle for spraying a measured quantity of tracer gas at a possible inleakage site. A gas detector is located within the turbine-condenser system for measuring the amount of tracer gas entering the turbine-condenser system through the possible leak site. An electronic gate means is positioned in the gas supply line between the pressure regulator and the nozzle. The gate means establishes a time interval of discharge of tracer gas and comprises a solenoid-operated valve coupled to a timer. An in-line standard flow impedance means is disposed between the electronic gate means and the spray nozzle for delivering a preselected volume of tracer gas to the nozzle. And, an integration means integrates output signals from the gas detector for determining the total amount of tracer gas entering a leak site.

BRIEF DESCRIPTION OF THE DRAWINGS

For a better understanding of the present invention, reference may be had to the following detailed description taken in conjunction with the accompanying drawings in which.

DETAILED DESCRIPTION OF THE DRAWINGS

Figure 1:
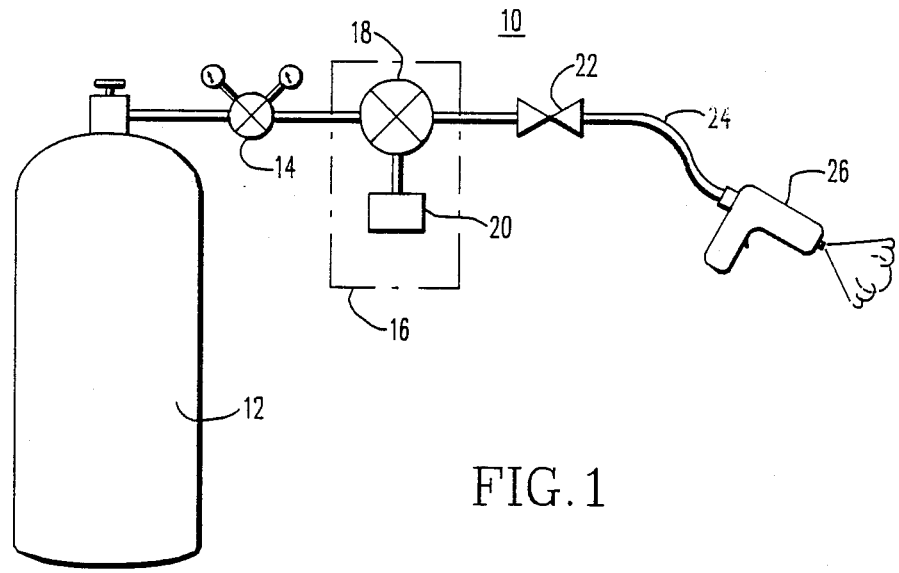
FIG. 1 is a schematic representation of the regulated tracer gas delivery system of the present invention.

With reference to FIG. 1, there is illustrated schematically, one embodiment of a tracer gas delivery system 10 in accordance with the teachings of the present invention. The system 10 comprises a pressurized tracer gas supply 12. Preferably, the tracer gas is helium although other gases could be used. The supply 12 shown is a conventional pressure tank with conventional pressure regulator 14 attached. An electric gate, indicated by the block 16, is installed downstream of regulator 14. Gate 16 includes a solenoid-operated valve 18 and a timer 20. A standard flow impedance 22, positioned downstream of electric gate 16, limits the flow rate of tracer gas. Flow impedance may comprise a restriction in the gas delivery line. From impedance 22, the gas travels through a delivery line 24 to a pistol-type spray nozzle 26, which is employed to direct a spray of tracer gas at a possible leakage site in the turbine-condenser system (not shown).

The tracer gas discharge pressure is set by adjusting regulator 14 in a manner well-known in the art. The duration of discharge is set by the timer 20. These known values, together with the known rate of flow through the impedance 22 will produce a known, reproducible quantity of tracer gas for each test. The timer 20 may be set for any desired gas release time such as, for example, three seconds. The timer 20 may include a connection to nozzle 26 so that it starts in response to actuation of the nozzle or, timer 20 may be responsive to gas flow through valve 18 for starting. Alternatively, the timer 20 may control the solenoid requiring that the timer be actuated to start the gas flow. In either situation, the timer 20 interrupts power to the solenoid actuated valve 18 so that the valve closes at the end of the set time interval.

Figure 2:
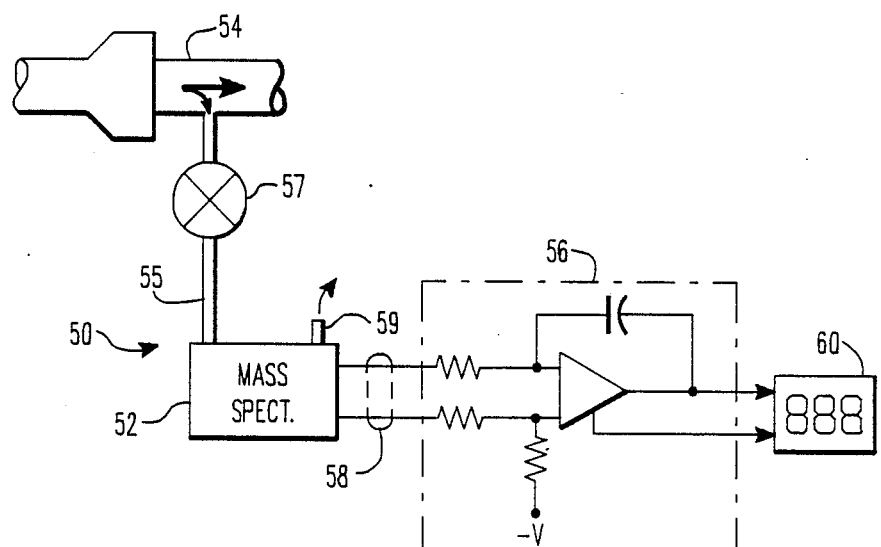
FIG. 2 is a schematic diagram of the tracer gas detection feature of the present invention.

FIG. 2 is a block diagram of the gas detection system 50 of the present invention. The system comprises a gas detector 52 positioned adjacent a turbine-condenser exhaust system 54 for detecting levels of tracer gas in a sample of an air exhausted from the system. The detector typically includes a mass spectrometer for identifying a gas and providing a quantitative output signal. A vacuum pump is typically used to pull a gas sample from the turbine exhaust 54 and supply it to detector 52 through tubing 55. A valve 57 is provided in tubing 55. The air/gas sample is exhausted to atmosphere from detector 52 through outlet 59. The output signal generated by the detector 52 is coupled via leads 58 to an integration circuit 56 which integrates the detector signal to provide a more quantitative representation. Circuit 56 can incorporate a threshold level −V representative of background gas levels so that only the detector response above the threshold level will be integrated. The integrator output signals may be coupled to a suitable display such as digital display 60. If the integration circuit is an analog circuit as shown, its output signal can be converted from analog to digital and displayed if desired using well-known digital display techniques and apparatus.

Figure 3:
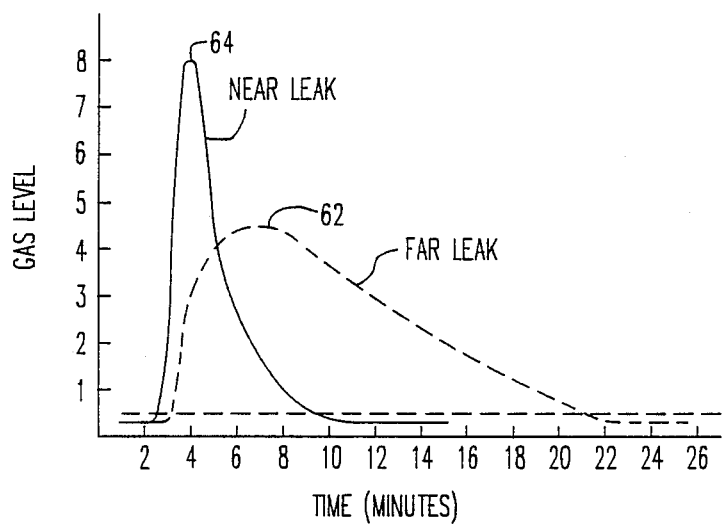
FIG. 3 compares typical detector response curves for a near leak and for a far leak.
Figure 4:
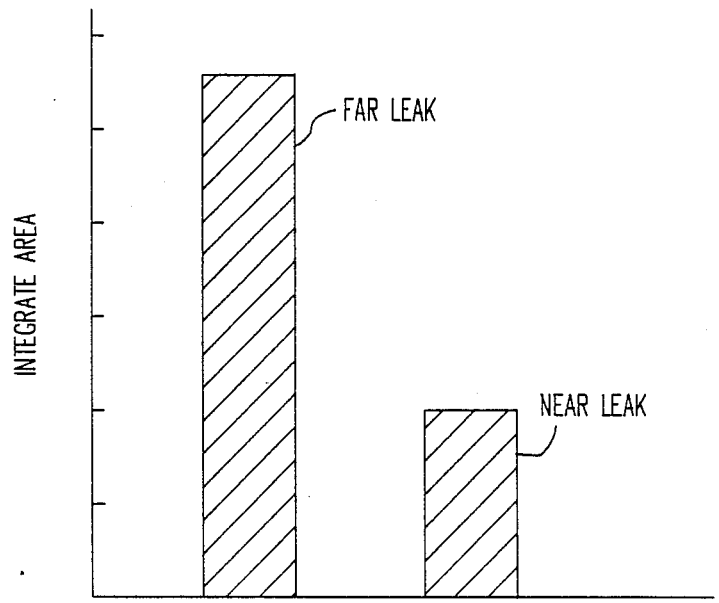
FIG. 4 compares total amount of inleakage for a near leak and a far leak determined by integrating detector response.

Incorporation of the integration circuit 56 greatly increases the accuracy of measurement of total tracer gas inleakage. FIG. 3 illustrates the difference in detector response to a near leak and to a far leak. A far leak results in a broad curve with a low, broad peak 62, whereas a near leak generates a sharp, narrow, high peak 64. Without taking into consideration the areas under the curves, the peaks alone do not yield enough information to gauge the size of the leaks or their location. If peak responses are used to identify leak size, the near leak will appear more significant than the far leaks. Only by integrating the detector response over time is it possible to compare leak size. FIG. 4 compares these areas after integration of the leak detector signal using an integration circuit 56.

This invention is particularly useful in comparing inleakage at a given leak site before and after repair. With precisely the same quantity of tracer gas being sprayed at the leak site both before and after repair, comparison of the output signals of the integration circuit 56 will show whether or not the repair was effective in eliminating a major source of leakage in the system.

It can be seen from the foregoing illustrations that the present invention provides a much more accurate, fast and sensitive method of gauging the size and relative location of various leaks in a turbine-condenser system. Because of the greater measurement sensitivity, less helium will be required to test the entire system, which in turn will decrease the amount of time to clear the system between tests, thereby greatly reducing the amount of time to complete an air inleakage test.

What is claimed is:

1. A method for determining size of air inleakage holes into a steam turbine system using a tracer gas detection system of the type including a source of tracer gas, at a regulated pressure, control means for discharging a preselected volume of tracer gas to a gas spray nozzle, pump means coupled to the turbine system for establishing an internal pressure less than ambient pressure and a gas detector for providing quantitative signals indicative of tracer gas in the turbine system, the method comprising the steps of:

delivering a predetermined quantity of tracer gas to the spray nozzle;

spraying the predetermined quantity of tracer gas at preslected inleakage sites about the turbine system;

determining the peak amplitude and time duration of detection of tracer gas at a preselected gas monitoring zone from signals from the gas detector;

integrating the gas detector signals to determine the quantity of tracer gas entering the turbine system through the inleakage site;

comparing the peak amplitude of the gas detector signals to the time duration of the signals to determine the relative distance from the inleakage site to the gas monitoring zone; and establishing a relative size of the air inleakage holes from the determined quantity of tracer gas obtained from the step of integrating.

* * * * *